(12) United States Patent
Rahardjo et al.

(10) Patent No.: US 10,719,400 B2
(45) Date of Patent: Jul. 21, 2020

(54) SYSTEM AND METHOD FOR SELF-HEALING BASIC INPUT/OUTPUT SYSTEM BOOT IMAGE AND SECURE RECOVERY

(71) Applicant: DELL PRODUCTS, LP, Round Rock, TX (US)

(72) Inventors: Johan Rahardjo, Austin, TX (US); Mukund P. Khatri, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 168 days.

(21) Appl. No.: 15/834,851

(22) Filed: Dec. 7, 2017

(65) Prior Publication Data

US 2018/0107558 A1 Apr. 19, 2018

Related U.S. Application Data

(63) Continuation of application No. 14/706,416, filed on May 7, 2015, now Pat. No. 9,846,617.

(51) Int. Cl.
*G06F 11/14* (2006.01)
*G06F 12/02* (2006.01)
(Continued)

(52) U.S. Cl.
CPC ........ *G06F 11/1417* (2013.01); *G06F 9/4406* (2013.01); *G06F 11/1469* (2013.01);
(Continued)

(58) Field of Classification Search
CPC ............ G06F 11/1417; G06F 11/1469; G06F 11/1666; G06F 9/4401; G06F 9/4406
See application file for complete search history.

(56) References Cited

U.S. PATENT DOCUMENTS 5,793,943 A 8/1998 Noll
7,143,275 B2 11/2006 Cepulis et al.
(Continued)

OTHER PUBLICATIONS

Wikipedia's Serial Peripheral Interface historical version published May 5, 2015 https://en.wikipedia.org/w/index.php?title=Serial_Peripheral_Interface&oldid=660975048 (Year: 2015).*
(Continued)

*Primary Examiner* — Joseph O Schell
(74) *Attorney, Agent, or Firm* — Larson Newman, LLP (57) ABSTRACT

An information handling system and method provides basic input/output system (BIOS) recovery. At a baseboard management controller (BMC), a basic input/output system (BIOS) boot failure is detected. A non-volatile memory device a recovery image is obtained. The recovery image comprises instructions to perform a system software management (SSM) task. The instructions to perform the SSM task are executed. The execution comprises loading a BIOS image from a BMC persistent storage memory device, verifying the BIOS image, and writing the BIOS image to a BIOS non-volatile memory device. The system and method may utilize a recovery flash memory device attached to the BMC, a recovery flash memory device attached to a southbridge portion of a chipset, or a combination thereof to perform the BIOS recovery.

17 Claims, 7 Drawing Sheets

(51) Int. Cl.
*G06F 9/4401* (2018.01)
*G06F 11/16* (2006.01)

(52) U.S. Cl.
CPC ........ *G06F 12/0246* (2013.01); *G06F 9/4401* (2013.01); *G06F 11/1666* (2013.01); *G06F 2201/805* (2013.01); *G06F 2201/84* (2013.01); *G06F 2201/85* (2013.01); *G06F 2212/7201* (2013.01)

(56) References Cited

U.S. PATENT DOCUMENTS

| | | | |
|---|---|---|---|
| 7,296,164 B2 | 11/2007 | Breen et al. | |
| 7,363,522 B2 | 4/2008 | Prosperi | |
| 7,484,084 B1 | 1/2009 | Ranaweera et al. | |
| 7,591,014 B2 | 9/2009 | England et al. | |
| 9,542,195 B1* | 1/2017 | Astarabadi | G06F 9/4401 |
| 2004/0003226 A1 | 1/2004 | Collins et al. | |
| 2004/0268116 A1* | 12/2004 | Vasisht | G06F 11/1417 713/100 |
| 2005/0204123 A1 | 9/2005 | Lee | |
| 2005/0229173 A1 | 10/2005 | Mihm et al. | |
| 2006/0020845 A1 | 1/2006 | Broyles, III et al. | |
| 2007/0250722 A1 | 10/2007 | Montero et al. | |
| 2007/0294575 A1 | 12/2007 | Aichelen et al. | |
| 2010/0095104 A1* | 4/2010 | Lewis | G06F 11/1417 713/2 |
| 2010/0205423 A1* | 8/2010 | Shao | G06F 11/1417 713/2 |
| 2012/0011393 A1* | 1/2012 | Roberts | G06F 11/1417 714/6.3 |
| 2012/0023320 A1 | 1/2012 | Chen et al. | |
| 2012/0023322 A1 | 1/2012 | Landry et al. | |
| 2014/0075171 A1* | 3/2014 | Karimian-Kakolaki | G06F 9/4418 713/2 |
| 2014/0101653 A1* | 4/2014 | Dharmadhikari | G06F 8/65 717/173 |
| 2014/0173267 A1 | 6/2014 | Chiu | |
| 2014/0372745 A1* | 12/2014 | Yu | G06F 9/4416 713/2 |
| 2015/0154091 A1 | 6/2015 | Chen | |

OTHER PUBLICATIONS

"Wikipedia's Platform Controller Hub," historical version from Apr. 28, 2015, (printed Sep. 27, 2016); pp. 1-8; https://en.wikipedia.org/w/index.pho?title=Platform_Controller_Hub&oldid=659663684.

* cited by examiner

SYSTEM AND METHOD FOR SELF-HEALING BASIC INPUT/OUTPUT SYSTEM BOOT IMAGE AND SECURE RECOVERY

CROSS REFERENCE TO RELATED APPLICATION

This application is a continuation of U.S. patent application Ser. No. 14/706,416 entitled "System and Method for Self-Healing Basic Input/Output System Boot Image and Secure Recovery," filed on May 7, 2015, and soon to issue as U.S. Pat. No. 9,846,617 the disclosure of which is hereby expressly incorporated by reference in its entirety.

FIELD OF THE DISCLOSURE

The present disclosure generally relates to information handling systems, and more particularly relates to recovery of a basic input/output system.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

Information handling systems typically use a basic input/output system (BIOS) to perform fundamental operations, such as performing a power on self test (POST), loading an operating system (OS), and other low level operations. The BIOS uses firmware (FW) instructions executed by a processor, such as a central processing unit (CPU) to perform the operations it provides. As technology advances, updating of BIOS FW can occur frequently. When a BIOS update fails, the information handling system may be rendered non-functional, and the motherboard on which the device storing the BIOS FW is located may have to be dispatched for repair.

Any of several things can go wrong during a BIOS update. As an example, a power outage may occur, preventing the BIOS update from being completed and leaving the BIOS in an improper state. While some attempts to provide a BIOS recovery feature have been made, they have been suffered from some limitations. As an example, they have imposed a significant component cost and occupied a significant amount of circuit board area. Typically, a BIOS recovery feature has required a second System Peripheral Interface (SPI) flash memory device of the same density as the main SPI flash memory device connected to the platform controller hub (PCH) or a single SPI flash memory device with a multiplexer to switch the SPI master, so that the BIOS serves as the SPI master during normal run-time and the baseboard management controller (BMC) serves as SPI master during recovery.

Some attempts to provide a BIOS recovery feature pose a security risk. As an example, having an out of band (OOB) processor (such as, a BMC) take over a BIOS SPI flash memory region can be potentially dangerous, as the memory region ownership arbitration between the BIOS, a management engine (ME), and an innovation engine (IE) with the BMC may result in a secondary system hang. A security risk can also exist if the BMC does not perform a signed update validation on the new BIOS image to be stored.

According to one technique, BIOS recovery has been achieved with dual BIOS images (such as, two BIOS SPI flash memory devices attached to a PCH). However, a need for two memory devices results in higher component costs. Also, security authentication limitations exist with such a technique. Another technique has used a multiplexer that allows a BMC having write capability to write to the BIOS SPI flash memory device attached to the PCH. However, the cost of the multiplexer increases component cost, and the technique does not solve the security authentication limitations. Yet another technique is to have BIOS boot SPI flash memory to be behind an embedded controller (EC) or BMC, which introduces another set of issues, which may include, for example, reliability or dependency on the BMC during a normal boot when the BMC is not yet ready, especially during alternating current (AC) power-up.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
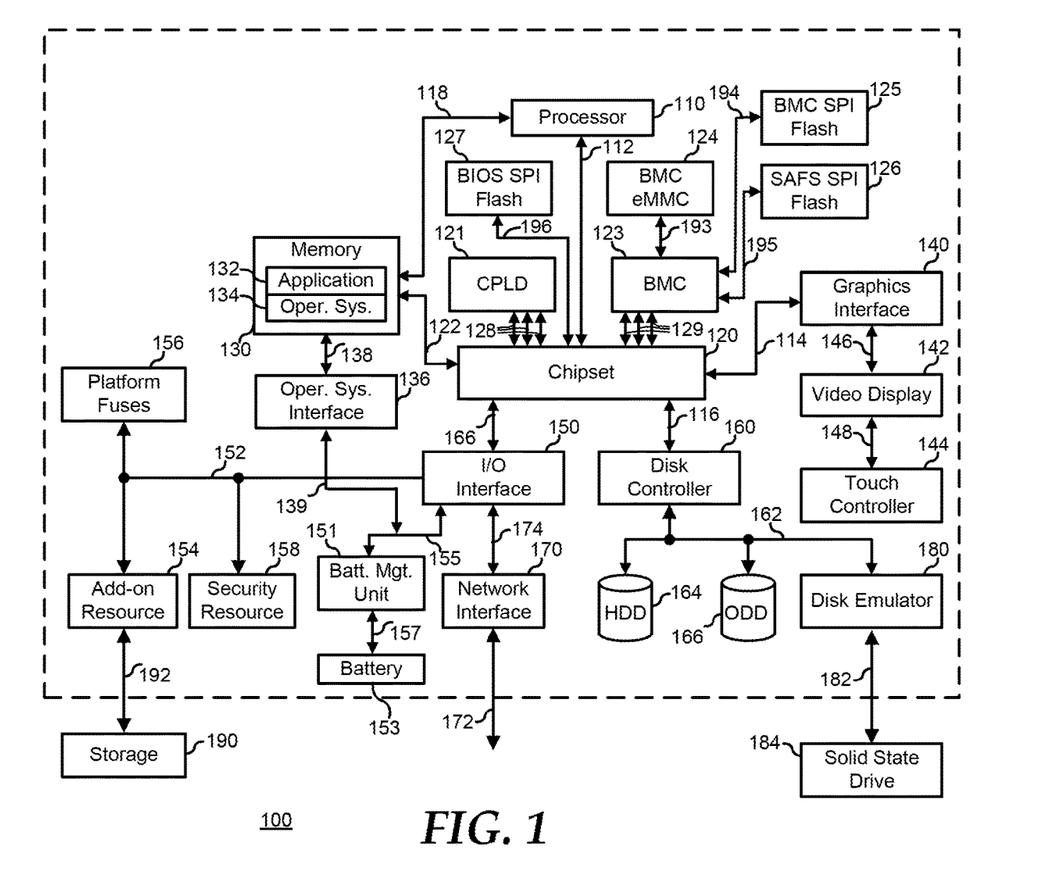
FIG. 1 is a block diagram illustrating an information handling system according to an embodiment of the present disclosure.

FIG. 1 illustrates a generalized embodiment of information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a CPU, a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described above, and operates to perform one or more of the methods described above. Information handling system 100 includes a processor 110, a chipset 120, a memory 130, a graphics interface 140, a disk controller 160, a disk emulator 180, an input/output (I/O) interface 150, and a network interface 170. Processor 110 is connected to chipset 120 via processor interface 112. Chipset 120, which is a motherboard core logic chipset, provides a southbridge, for example an I/O controller hub (ICH), and can also provide a northbridge. An example of chipset 120 includes a platform controller hub (PCH), which may equivalently be implemented as a fusion controller hub (FCH). An example of processor interface 112 includes a direct media interface (DMI), which may equivalently be implemented as a unified media interface (UMI). The southbridge of chipset 120 provides communication between processor 110 and peripherals, for example, via I/O interface 150. Processor 110 is connected to memory 130 via memory bus 118. Memory 130 is connected to chipset 120 via a memory bus 122. Graphics interface 140 is connected to chipset 120 via a graphics interface 114, and provides a video display output 146 to a video display 142. Video display 142 is connected to touch controller 144 via touch controller interface 148. In a particular embodiment, information handling system 100 includes separate memories that are dedicated to processor 110 via separate memory interfaces. An example of memory 130 includes random access memory (RAM) such as static RAM (SRAM), dynamic RAM (DRAM), non-volatile RAM (NV-RAM), or the like, read only memory (ROM), another type of memory, or a combination thereof. Memory 130 can store, for example, at least one application 132 and operating system 134. Operating system 134 includes operating system code operable to detect resources within information handling system 100, to provide drivers for the resources, initialize the resources, to access the resources, and to support execution of the at least one application 132. Operating system 134 has access to system elements via an operating system interface 136. Operating system interface 136 is connected to memory 130 via connection 138.

Battery management unit (BMU) 151 is connected to I/O interface 150 via battery management unit interface 155. BMU 151 is connected to battery 153 via connection 157. Operating system interface 136 has access to BMU 151 via connection 139, which is connected from operating system interface 136 to battery management unit interface 155. Graphics interface 140, disk controller 160, and I/O interface 150 are connected to chipset 120 via interfaces that may be implemented, for example, using a Peripheral Component Interconnect (PCI) interface, a PCI-Extended (PCI-X) interface, a high-speed PCI-Express (PCIe) interface, another industry standard or proprietary communication interface, or a combination thereof. Chipset 120 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof.

Disk controller 160 is connected to chipset 120 via connection 116. Disk controller 160 includes a disk interface 162 that connects the disc controller to a hard disk drive (HDD) 164, to an optical disk drive (ODD) 166, and to disk emulator 180. An example of disk interface 162 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 180 permits a solid-state drive 184 to be connected to information handling system 100 via an external interface 182. An example of external interface 182 includes a USB interface, an IEEE 1194 (Firewire) interface, a proprietary interface, or a combination thereof. Alternatively, solid-state drive 184 can be disposed within information handling system 100.

I/O interface 150 is connected to chipset 120 via connection 166. I/O interface 150 includes a peripheral interface 152 that connects the I/O interface to an add-on resource 154, to platform fuses 156, and to a security resource 158. Peripheral interface 152 can be the same type of interface as connects graphics interface 140, disk controller 160, and I/O interface 150 to chipset 120, or can be a different type of interface. As such, I/O interface 150 extends the capacity of such an interface when peripheral interface 152 and the I/O channel are of the same type, and the I/O interface translates information from a format suitable to such an interface to a format suitable to the peripheral channel 152 when they are of a different type. Add-on resource 154 can include a data storage system, an additional graphics interface, a network interface card (NIC), a sound/video processing card, another add-on resource, or a combination thereof. As an example, add-on resource 154 is connected to data storage system 190 via data storage system interface 192. Add-on resource 154 can be on a main circuit board, on separate circuit board or add-in card disposed within information handling system 100, a device that is external to the information handling system, or a combination thereof.

Network interface 170 represents a NIC disposed within information handling system 100, on a main circuit board of the information handling system, integrated onto another component such as chipset 120, in another suitable location, or a combination thereof. Network interface 170 is connected to I/O interface 150 via connection 174. Network interface device 170 includes network channel 172 that provides an interface to devices that are external to information handling system 100. In a particular embodiment, network channel 172 is of a different type than peripheral channel 152 and network interface 170 translates information from a format suitable to the peripheral channel to a format suitable to external devices. An example of network channels 172 includes InfiniBand channels, Fibre Channel channels, Gigabit Ethernet channels, proprietary channel architectures, or a combination thereof. Network channel 172 can be connected to external network resources (not illustrated). The network resource can include another information handling system, a data storage system, another network, a grid management system, another suitable resource, or a combination thereof.

Complex programmable logic device (CPLD) 121 is connected to chipset 120 via connections 128. Basic input/output system (BIOS) serial peripheral interface (SPI) flash memory 127 is connected to chipset 120 via connection 196. Baseboard management controller (BMC) 123 is connected to chipset 120 via connections 129. BMC embedded multimedia memory card (eMMC) memory 124 is connected to BMC 123 via connection 193. BMC SPI flash memory 125 is connected to BMC 123 via connection 194. Slave attached SPI flash memory 126 is connected to BMC 123 via connection 195. As an example, chipset 120 can be a platform controller hub (PCH).

Figure 2:
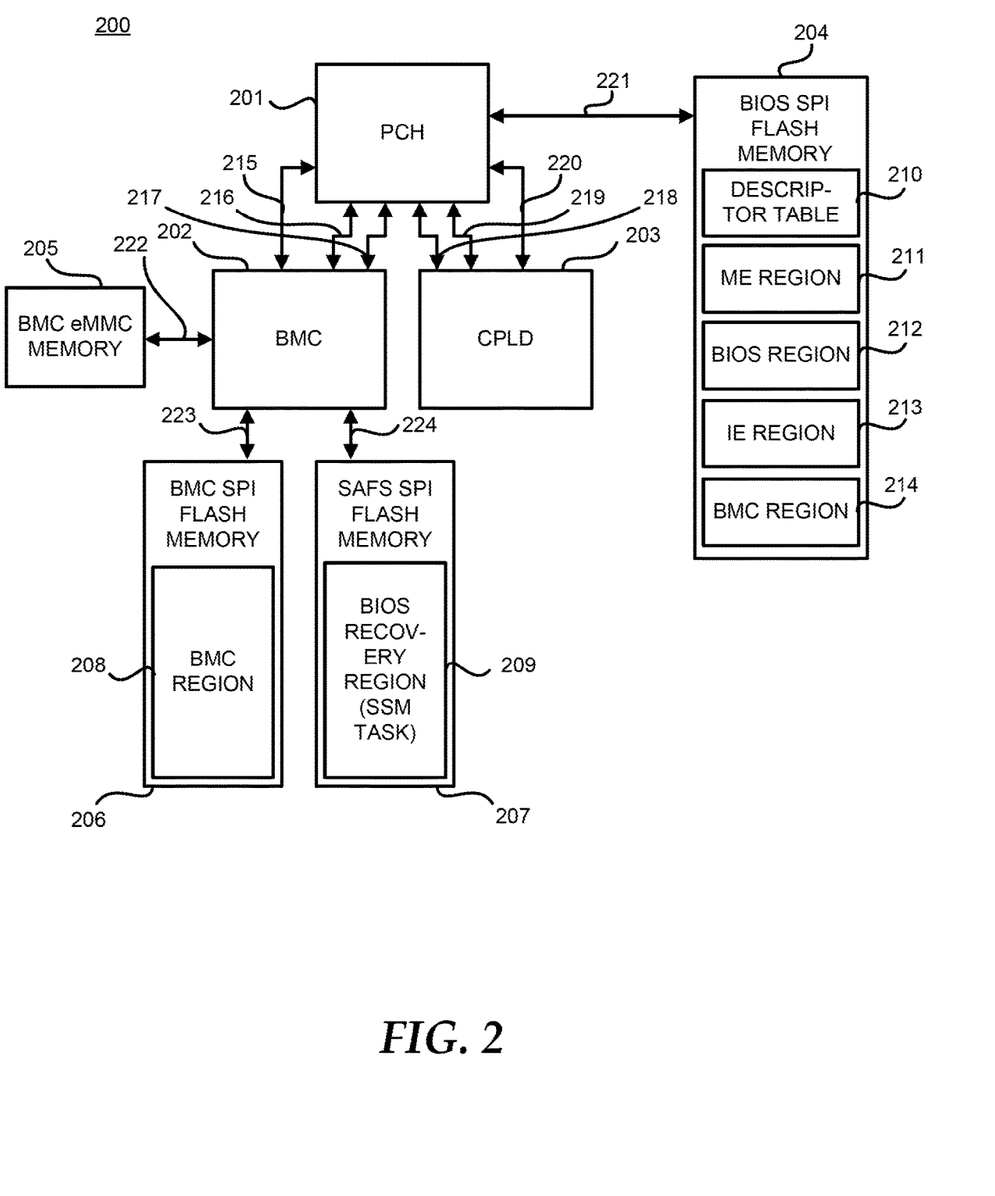
FIG. 2 is a block diagram illustrating an apparatus using a recovery flash memory device attached to a baseboard management controller (BMC) according to an embodiment of the present disclosure.

FIG. 2 is a block diagram illustrating an apparatus using a recovery flash memory device attached to a BMC according to an embodiment of the present disclosure. The recovery flash memory device attached to the BMC will be described below as slave attached flash storage (SAFS), utilizing SAFS SPI flash memory 207, although it should be understood that other embodiments may alternatively be implemented. Apparatus 200 comprises platform controller hub (PCH) 201, BMC 202, complex programmable logic device (CPLD) 203, BIOS SPI flash memory 204, BMC eMMC memory 205, BMC SPI flash memory 206, and SAFS SPI flash memory 207. PCH 201 is connected to BIOS SPI flash memory 204 via connection 221. BIOS SPI flash memory 204 comprises descriptor table 210, management engine (ME) region 211, BIOS region 212, innovation engine (IE) region 213, and BMC region 214. PCH 201 is connected to BMC 202 via connections 215, 216, and 217. As examples, connection 215 can be a universal serial bus (USB) connection, connection 216 can be an enhanced serial peripheral interface (eSPI) chip select zero (CS0) connection, and connection 217 can be an eSPI data bus connection.

BMC 202 is connected to BMC eMMC memory 205 via connection 222. BMC 202 is connected to BMC SPI flash memory 206 via connection 223. BMC SPI flash memory 206 comprises BMC region 208. BMC 202 is connected to SAFS SPI flash memory 207 via connection 224. SAFS SPI flash memory 207 comprises BIOS recovery region (system software management (SSM) task) 209. The BIOS recovery region stores information to allow BIOS recovery (e.g., restoration of proper operation of the BIOS) using an SSM task. PCH 201 is connected to CPLD 203 via connections 218, 219, and 220. As examples, connection 218 can be an eSPI data bus connection, connection 219 can be an eSPI CS0 connection, and connection 220 can be a SPI boot select strapping connection.

Figure 3:
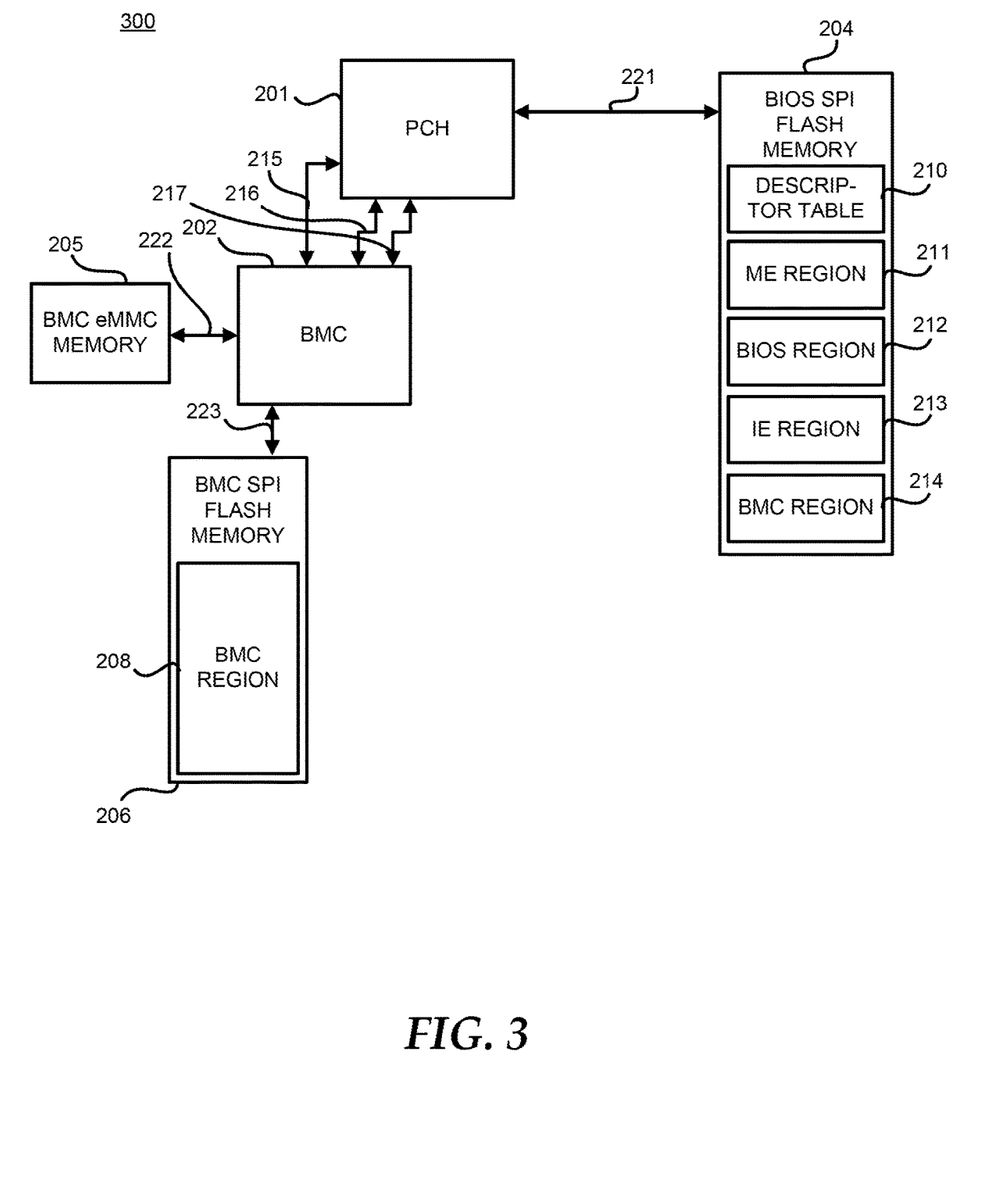
FIG. 3 is a flow diagram illustrating an apparatus using a recovery flash memory device attached to a southbridge portion of a chipset according to an embodiment of the present disclosure.

FIG. 3 is a flow diagram illustrating an apparatus using a recovery flash memory device attached to a southbridge portion of a chipset according to an embodiment of the present disclosure. The recovery flash memory device attached to the southbridge portion of the chipset will be described below as master attached flash storage (MAFS), although it should be understood that other embodiments may alternatively be implemented. Apparatus 300 comprises the elements of apparatus 200 described above with respect to FIG. 2 except for CPLD 203, its connections 218, 219, and 220, SAFS SPI flash memory 207 (including BIOS recovery region (SSM task) 209), and its connection 224.

Figure 4:
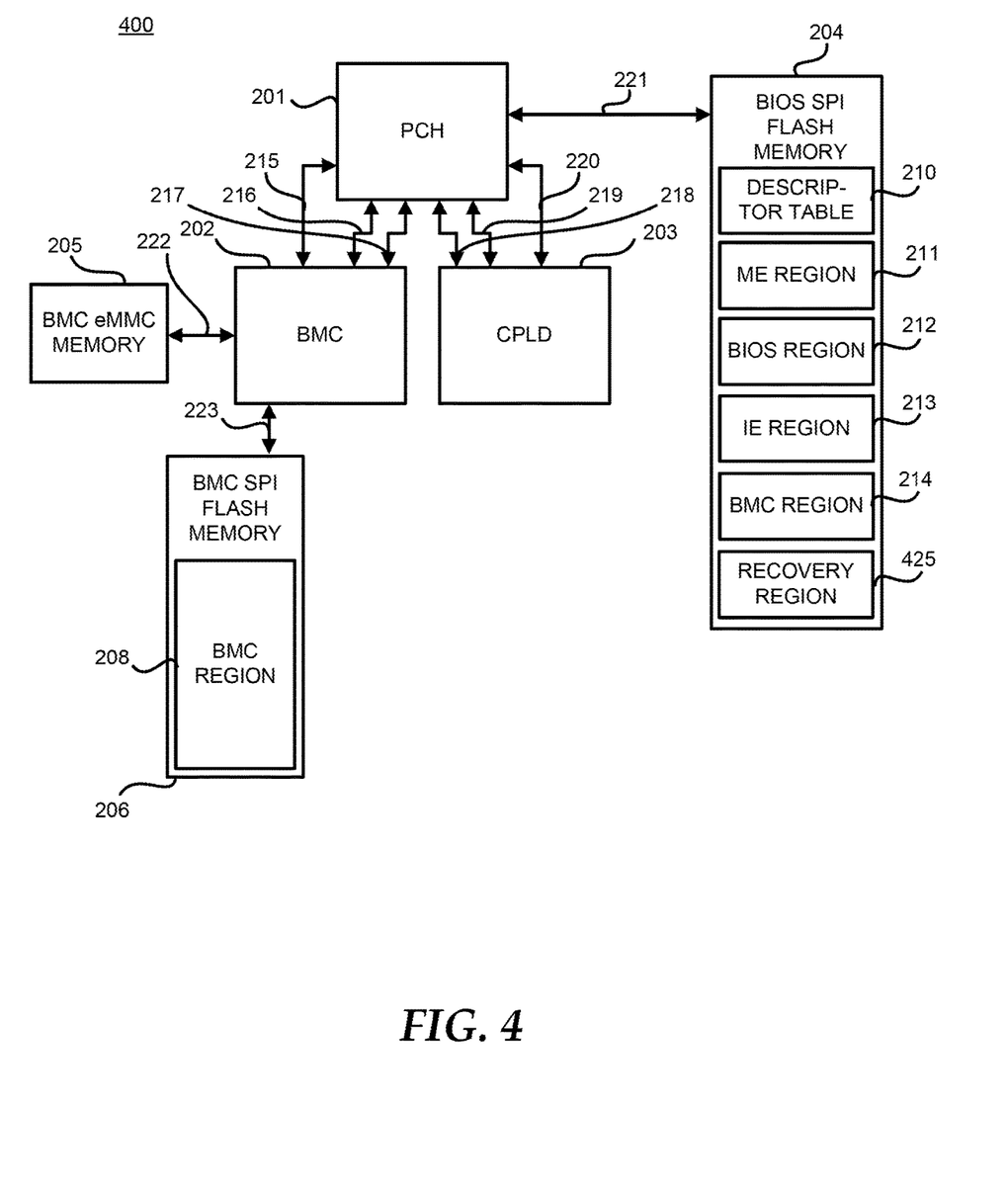
FIG. 4 is a flow diagram illustrating an apparatus using a recovery flash memory device attached to a southbridge portion of a chipset with a BIOS flash recovery region according to an embodiment of the present disclosure.

FIG. 4 is a flow diagram illustrating an apparatus using a recovery flash memory device attached to a southbridge portion of a chipset with a BIOS flash recovery region according to an embodiment of the present disclosure. The recovery flash memory device attached to the southbridge portion of the chipset will be described below as master attached flash storage (MAFS), although it should be understood that other embodiments may alternatively be implemented. Apparatus 400 comprises the elements of apparatus 200 described above with respect to FIG. 2 except for SAFS SPI flash memory 207 (including BIOS recovery region (SSM task) 209), and its connection 224. BIOS SPI flash memory 204 of apparatus 400 further comprises recovery region 425. Recovery region 425 stores information to allow BIOS recovery (e.g., restoration of proper operation of the BIOS) using an SSM task.

Figure 5:
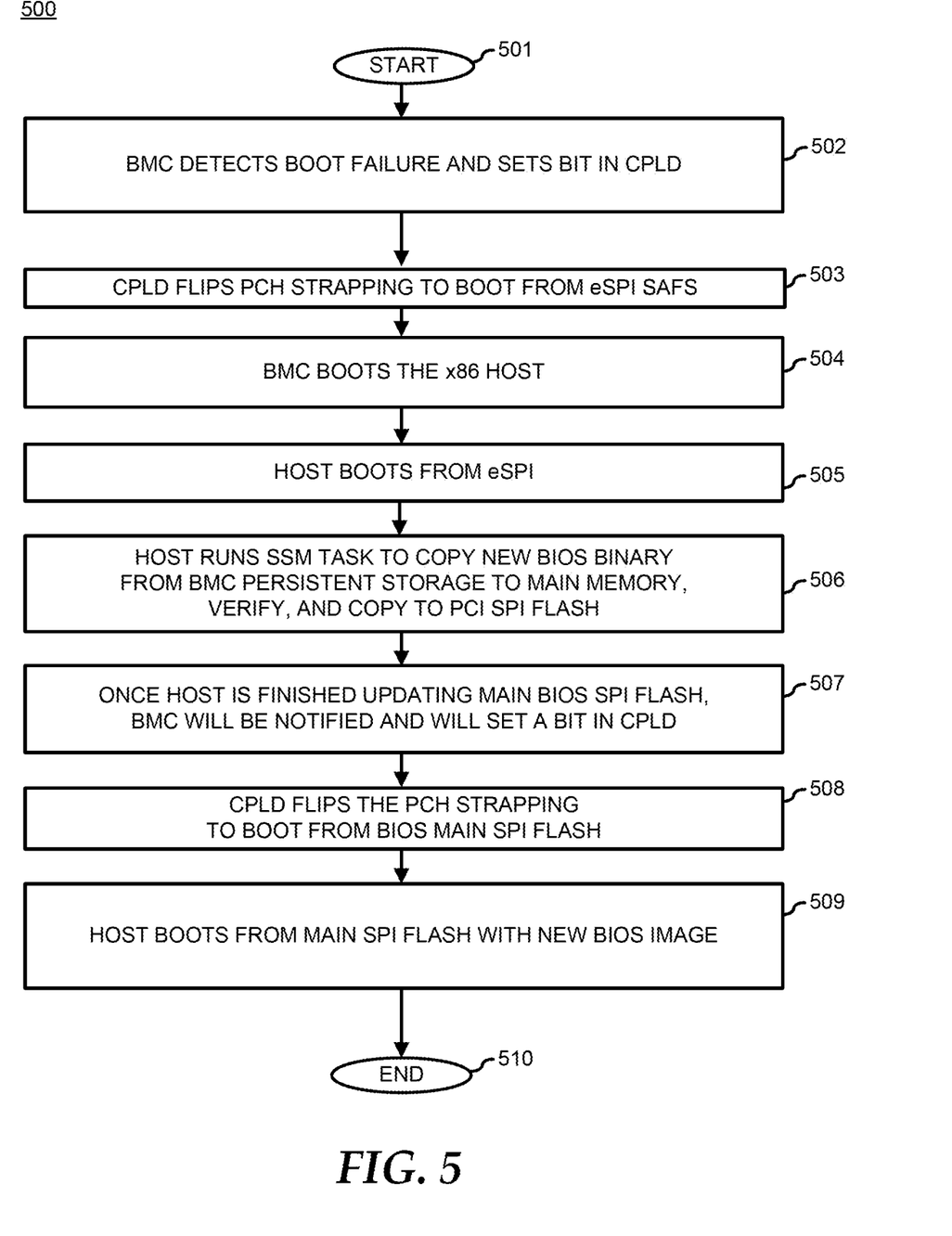
FIG. 5 is a flow diagram illustrating a method for BIOS recovery using a recovery flash memory device attached to a baseboard management controller (BMC) according to an embodiment of the present disclosure.

FIG. 5 is a flow diagram illustrating a method for BIOS recovery using a recovery flash memory device attached to a BMC according to an embodiment of the present disclosure. The recovery flash memory device attached to the BMC will be described below as slave attached flash storage (SAFS), although it should be understood that other embodiments may alternatively be implemented. Method 500 begins in block 501. From block 501, method 500 continues to block 502. In block 502, the BMC detects a boot failure and sets a bit in the CPLD. From block 502, method 500 continues to block 503. In block 503, the CPLD flips the PCH strapping to boot from eSPI SAFS. From block 503, method 500 continues to block 504. In block 504, the BMC boots the x86 host CPU. The term x86 refers to a microprocessor architecture typically used in personal computers (PCs). From block 504, method 500 continues to block 505. In block 505, the host boots from eSPI. From block 505, method 500 continues to block 506. In block 506, the host runs the SSM task to copy a new BIOS binary from BMC persistent storage to main memory, verifies the new BIOS binary, and copies the new BIOS binary to PCI SPI flash. From block 506, method 500 continues to block 507. In block 507, once the host is finished updating main BIOS SPI flash memory, the BMC will be notified and will set a bit in the CPLD. From block 507, method 500 continues to block

508. In block 508, CPLD flips the PCH strapping to boot from BIOS main SPI flash. From block 508, method 500 continues to block 509. In block 509, the host boots from main SPI flash using the new BIOS image. From block 509, method 500 continues to block 510, where it ends.

Figure 6:
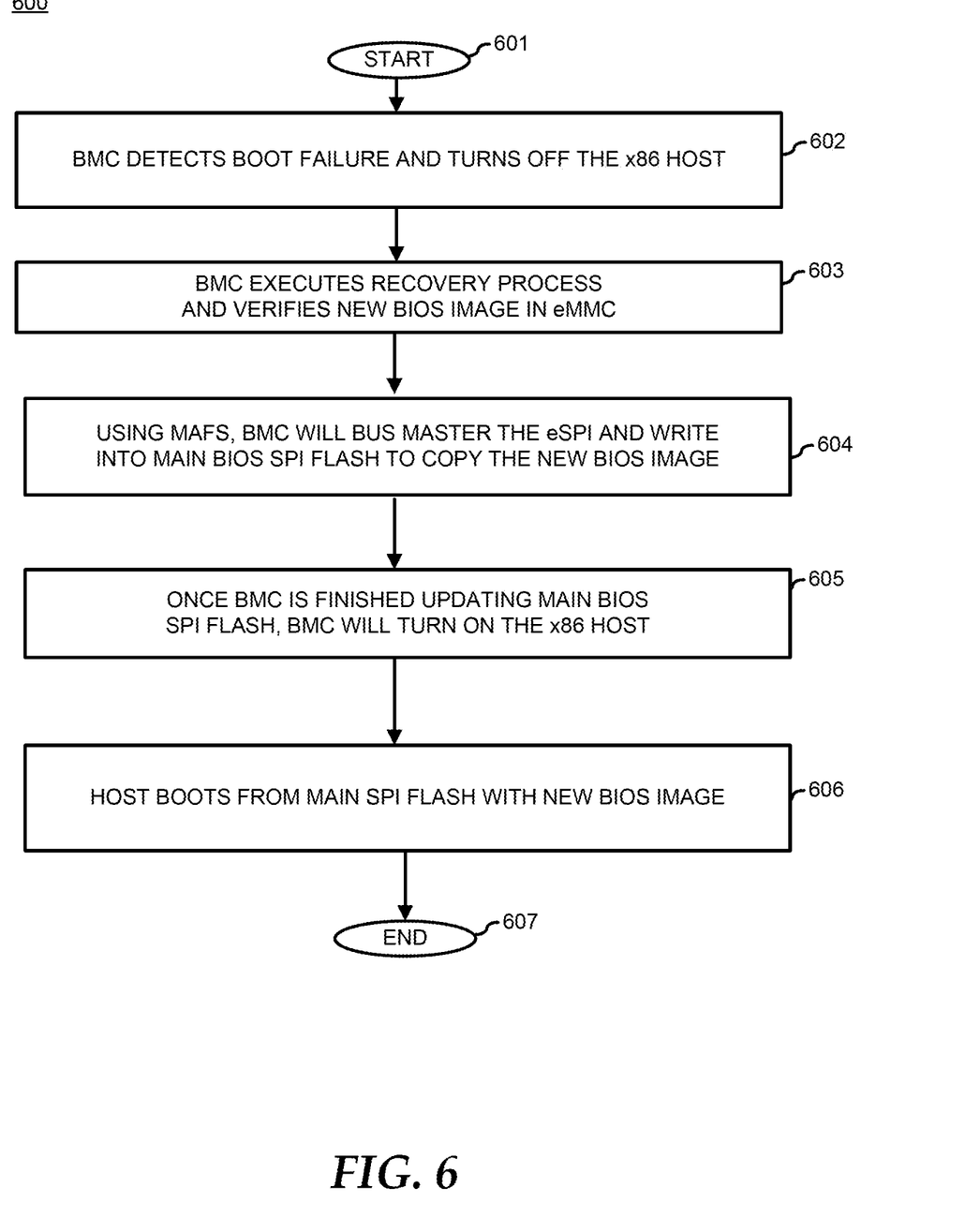
FIG. 6 is a flow diagram illustrating a method for BIOS recovery using a recovery flash memory device attached to a southbridge portion of a chipset according to an embodiment of the present disclosure.

FIG. 6 is a flow diagram illustrating a method for BIOS recovery using a recovery flash memory device attached to a southbridge portion of a chipset according to an embodiment of the present disclosure. The recovery flash memory device attached to the southbridge portion of the chipset will be described below as master attached flash storage (MAFS), although it should be understood that other embodiments may alternatively be implemented. Method 600 begins in block 601. From block 601, method 600 continues to block 602. In block 602, the BMC detects boot failure and turns off the x86 host. From block 602, method 600 continues to block 603. In block 603, the BMC executes a recovery process and verifies the new BIOS image in eMMC memory. From block 603, method 600 continues to block 604. In block 604, using a recovery flash memory device attached to a southbridge portion of a chipset, the BMC will bus master the eSPI and writes into main BIOS SPI flash memory to copy the new BIOS image. From block 604, method 600 continues to block 605. In block 605, once the BMC is finished updating the main BIOS SPI flash memory, the BMC will turn on the x86 host. From block 605, method 600 continues to block 606. In block 606, the host boots from main SPI flash memory using the new BIOS image. From block 606, method 600 continues to block 607, where it ends.

Figure 7:
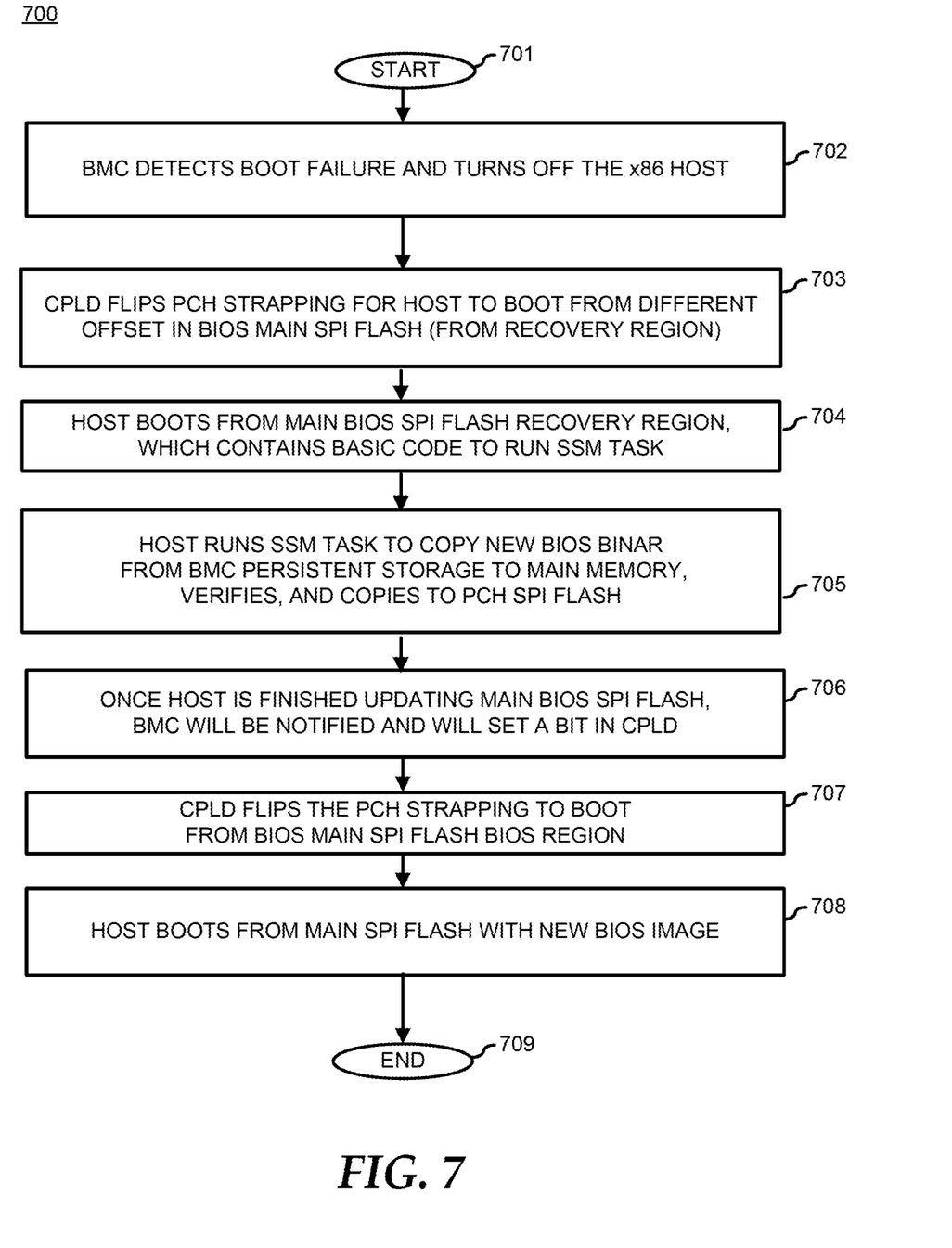
FIG. 7 is a flow diagram illustrating a method for BIOS recovery using a recovery flash memory device attached to a southbridge portion of a chipset and having a BIOS flash recovery region according to an embodiment of the present disclosure.

FIG. 7 is a flow diagram illustrating a method for BIOS recovery using a recovery flash memory device attached to a southbridge portion of a chipset and having a BIOS flash recovery region according to an embodiment of the present disclosure. The recovery flash memory device attached to the southbridge portion of the chipset will be described below as master attached flash storage (MAFS), although it should be understood that other embodiments may alternatively be implemented. Method 700 begins in block 701. From block 701, method 700 continues to block 702. In block 702, the BMC detects a boot failure and turns off the x86 host. From block 702, method 700 continues to block 703. In block 703, the CPLD flips PCH strapping for the host to boot from a different offset in BIOS main SPI flash (such as, from the recovery region). From block 703, method 700 continues to block 704. In block 704, the host boots from the main BIOS SPI flash recovery region, which contains basic code to run a SSM task. From block 704, method 700 continues to block 705. In block 705, the host runs the SSM task to copy the new BIOS binary from BMC persistent storage to main memory, verifies the new BIOS binary, and copies the new BIOS binary to PCH SPI flash memory. From block 705, method 700 continues to block 706. In block 706, once the host is finished updating the main BIOS SPI flash memory, the BMC will be notified and will set a bit in the CPLD. From block 706, method 700 continues to block 707. In block 707, the CPLD flips the PCH strapping to boot from the BIOS main SPI flash memory BIOS region. From block 707, method 700 continues to block 708. In block 708, the host boots from main SPI flash memory using the new BIOS image. From block 708, method 700 continues to block 709, where it ends.

In accordance with at least one embodiment, a method for BIOS self-healing and staged BIOS boot image secure recovery is provided. In accordance with at least one embodiment, the method involves transfer of data through an enhanced serial peripheral interface (eSPI). In accordance with at least one embodiment, the method uses a recovery flash memory device attached to the BMC, such as may be provided, for example, using SAFS. In accordance with at least one embodiment, the method uses a recovery flash memory device attached to the southbridge portion of the chipset, such as may be provided, for example, using MAFS. The eSPI enables sharing of flash memory between devices. Sharing of flash memory can be implemented, as an example, as SAFS or, as another example, as MAFS. The BMC detects system boot failure due to BIOS corruption and uses a recovery image that performs a limited system software management (SSM) task to copy a BIOS image. The recovery image does not contain the full BIOS image. Rather the recovery image contains SSM task code that boots the host x86 system into a recovery stage. The recovery image is stored in BMC persistent storage and the recovery process is executed either by the host x86 CPU, in the case of the SAFS option, or by the BMC service processor, in the case of the MAFS option. The x86 system, booted into the recovery stage, will then load, verify, and update the full BIOS SPI flash memory image. The full BIOS SPI flash memory may contain, for example, BIOS, ME, IE, and BMC firmware images.

BMC may implement a boot failure detection mechanism by implementing a time-out timer from a host reset event (such as, a platform reset) to when a BIOS power on self test (POST) ends (such as, when a BIOS event is delivered to the BMC). The time-out timer value can be dynamically configured depending on previous or current system inventory obtained using Collect System Inventory on Restart (CSIOR). When the timer expires, the BMC service processor will initiate the recovery process. The recovery image is hosted in BMC persistent storage. As an example, the x86 host CPU can access the recovery image using eSPI SAFS. The SAFS accessible recovery image is a small image (such as, smaller in size than the size of a full BIOS image) that can be stored in a much smaller dedicated BMC SPI flash memory or part of main BMC boot SPI flash memory (for example 1 MB, compared to 16 MB main BIOS flash memory). The BMC SPI flash memory is downstream from the BMC (such as, not attached to the PCH). Upon the BMC detecting system a boot failure, digital logic gates, such as those of a complex programmable logic device (CPLD), toggle the PCH strapping pin so that BIOS boots from eSPI slave on the next BMC initiated reboot (such as, instead of booting from SPI flash memory directly attached to PCH, the system will boot from a SPI flash memory attached to the BMC). The x86 host CPU will then run a SSM task (such as, fetched from the recovery image), which will act as an agent to perform digital signature verification of the new BIOS image (stored in BMC embedded multimedia card (eMMC) memory or similar) using the public key and update the BIOS in the main BIOS SPI flash memory attached to PCH. To prevent any malicious attack to the recovery image, the persistent storage containing recovery image can be permanently locked at the factory (as it contains minimal code to allow recovery).

As another example, MAFS is used to copy the new BIOS image into main SPI flash memory. Upon the BMC detecting a BIOS boot failure, the BMC service processor executes the recovery image (which may, for example, be part of BMC firmware (FW)). The BMC service processor, when executing the recovery image, verifies the authenticity of the new BIOS image (from the BMC eMMC memory or similar), then updates the main BIOS SPI flash memory image through the MAFS. The BMC Service Processor acts as a SPI master through the eSPI bus to write the new BIOS image into the main BIOS SPI flash memory.

As yet another example, both MAFS and SAFS are used to perform BIOS recovery. MAFS is used by the BMC to copy the recovery image (which contains, for example, a SSM task) from BMC persistent storage (for example, a BMC eMMC memory) into main BIOS SPI flash memory, then SAFS is used by the recovery image (such as, the SSM task) to load the new BIOS image into main BIOS SPI flash memory. Upon detecting BIOS boot failure, the BMC copies the recovery image into main BIOS SPI flash memory through eSPI MAFS. Then BMC reboots the host, which allows the x86 host CPU to run the SSM task to copy the new BIOS image from the BMC persistent storage into main system memory and then to verify the authenticity of the new BIOS image prior to updating the main BIOS SPI flash memory.

In accordance with at least one embodiment, the BMC detects a BIOS boot failure using a BIOS event and a timer. In accordance with at least one embodiment, The BMC uses BMC SAFS to host a recovery image. The recovery image does not contain a full BIOS image. Rather, in accordance with at least one embodiment, the recovery image stores executable code for a SSM task for execution on a host x86 CPU. The host x86 CPU verifies the authenticity of a new full BIOS image stored elsewhere (such as, in BMC persistent storage, such as in BMC eMMC memory) and copies the authenticated full BIOS image from the BMC persistent storage into main BIOS SPI flash memory. In accordance with at least one embodiment, MAFS is used as an eSPI master to allow the BMC to verify authenticity and copy the new full BIOS image from BMC persistent storage to main BIOS SPI flash memory.

One or more embodiments may be implemented to provide better security with digital signature verification before the BMC service processor copies the new BIOS binary image. One or more embodiments may be implemented to limit the entity that can write to main BIOS SPI memory (such as, through the use of a SSM Task recovery image), thereby preventing unauthorized entities from writing to main BIOS SPI memory. One or more embodiments may be implemented to provide a reduced component cost by utilizing a reduced-size recovery image (such as, smaller than a full BIOS image) that can be stored in a smaller, less expensive memory device. One or more embodiments may be implemented to utilize eSPI architecture and bus protocols for compatibility and availability of suitable devices.

One or more embodiments may be implemented to improve server reliability and serviceability (RAS) by enabling secure self healing of a server. One or more embodiments may be applied to industrial or computing systems that have firmware (FW) and provide sideband access (such as, provide access to the memory device storing the firmware by a service processor in addition to the typical access provided for a main CPU). In accordance with at least one embodiment, a method comprises detecting, at a BMC, a basic input/output system (BIOS) boot failure, obtaining from a non-volatile memory device a recovery image, the recovery image comprising instructions to perform a system software management (SSM) task, and executing the instructions to perform the SSM task. The executing comprises loading a BIOS image from a BMC persistent storage memory device, verifying the BIOS image, and writing the BIOS image to a BIOS non-volatile memory device. In accordance with at least one embodiment, the obtaining from the non-volatile memory device the recovery image comprises obtaining the recovery image using SAFS. In accordance with at least one embodiment, the obtaining from the non-volatile memory device the recovery image comprises obtaining the recovery image using MAFS. In accordance with at least one embodiment, the writing the BIOS image to the BIOS non-volatile memory device comprises writing the BIOS image using SAFS.

In accordance with at least one embodiment, the writing the BIOS image to the BIOS non-volatile memory device comprises writing the BIOS image using MAFS. In accordance with at least one embodiment, the executing the instructions to perform the SSM task comprises executing the instructions by a host CPU to perform the SSM task. In accordance with at least one embodiment, the executing the instructions to perform the SSM task comprises executing the instructions by the BMC to perform the SSM task. In accordance with at least one embodiment, the BIOS non-volatile memory device is the non-volatile memory device. In accordance with at least one embodiment, the BIOS non-volatile memory device is distinct from the non-volatile memory device. In accordance with at least one embodiment, the detecting is performed based on an occurrence of a BIOS event and a timing of a timer.

In accordance with at least one embodiment, an information handling system comprises a host CPU, a platform controller hub (PCH) coupled to the host CPU, a basic input/output system (BIOS) non-volatile memory coupled to the PCH, a BMC coupled to the PCH, and a BMC persistent storage memory device coupled to the BMC. The BMC is configured to detect a basic input/output system (BIOS) boot failure, wherein a processor selected from a group consisting of the host CPU and the BMC is configured to obtain from a non-volatile memory device a recovery image. The recovery image comprises instructions to perform a system software management (SSM) task, and to execute the instructions to perform the SSM task so as to load a BIOS image from the BMC persistent storage memory device, to verify the BIOS image, and to write the BIOS image to a BIOS non-volatile memory device. In accordance with at least one embodiment, to obtain the recovery image, the processor is configured to use SAFS. In accordance with at least one embodiment, to obtain the recovery image, the processor is configured to use MAFS. In accordance with at least one embodiment, to write the BIOS image, the processor is configured to use SAFS. In accordance with at least one embodiment, to write the BIOS image, the processor is configured to use MAFS. In accordance with at least one embodiment, the processor is the host CPU. In accordance with at least one embodiment, the processor is the BMC. In accordance with at least one embodiment, the BIOS non-volatile memory device is the non-volatile memory device. In accordance with at least one embodiment, the BMC is configured to detect the BIOS boot failure based on an occurrence of a BIOS event and a timing of a timer.

In accordance with at least one embodiment, a method comprises detecting, at a BMC, a basic input/output system (BIOS) boot failure, obtaining from a non-volatile memory device a recovery image, the recovery image comprising instructions to perform a system software management (SSM) task, and executing, by a processor selected from a group consisting of a host CPU and the BMC, the instructions to perform the SSM task. The executing comprises loading a BIOS image from a BMC persistent storage memory device, verifying the BIOS image, and writing the BIOS image to a BIOS non-volatile memory device, wherein a flash sharing selected from a group consisting of SAFS and MAFS is used to perform at least one of the obtaining and the executing. In accordance with at least one embodiment, the BIOS non-volatile memory device is the non-volatile memory device.

At least one embodiment may be implemented as instructions stored on a nontransitory computer readable medium. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (such as random-access memory, etc.), nonvolatile (read-only memory, flash memory etc.) or any combination thereof), one or more processing resources, such as a CPU, a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
   a central processing unit (CPU);
   a main memory device;
   a basic input/output system (BIOS) memory device coupled to the CPU, the BIOS memory device including first instructions stored at a first offset within the BIOS memory device and second instructions stored at a second offset within the BIOS memory device, the first instructions to boot the information handling system and the second instructions to perform a system software management (SSM) task; and
   a baseboard management controller (BMC) coupled to the CPU, wherein the BMC is configured to:
      detect a BIOS boot failure on the CPU in response to a boot of the information handling system from the first offset;
      turn off the CPU in response to detecting the BIOS boot failure; and
      direct the CPU to boot the information handling system from the second offset;
   wherein the CPU is configured to execute the SSM task to:
      obtain a BIOS recovery image;
      write the BIOS recovery image to the main memory device;
      verify the BIOS recovery image; and write the BIOS recovery image from the main memory device to the BIOS memory device at the first offset;
wherein the BMC is further configured, in response to the CPU completing the SSM task, to direct the CPU to boot the information handling system from the first offset.

2. The information handling system of claim 1, further comprising:
a BMC persistent memory device coupled to the BMC.

3. The information handling system of claim 2, wherein the BMC persistent memory device is a master attached flash storage device.

4. The information handling system of claim 2, wherein the BIOS recovery image is obtained from the BMC persistent memory device.

5. The information handling system of claim 1, further comprising:
a complex programmable logic device (CPLD) coupled to the CPU and including a bit location which, when set in a first state, directs the CPU to boot the information handling system from the first offset, and, when set in a second state, directs the CPU to boot the information handling system from the second offset.

6. The information handling system of claim 5, wherein in directing the CPU to boot the information handling system from the second offset, the BMC is further configured to:
set the bit location from the first state to the second state.

7. The information handling system of claim 6, wherein in directing the CPU to boot the information handling system from the first offset, the BMC is further configured to:
set the bit location from the second state to the first state.

8. The information handling system of claim 1, wherein in executing the SMM task, the CPU is further configured to:
verify the recovery image prior to writing the recovery image to the BIOS memory device.

9. The information handling system of claim 1, wherein in executing the SMM task, the CPU is further configured to:
notify the BMC that the CPU has completed the SSM task.

10. A method, comprising:
detecting, by a baseboard management controller (BMC) coupled to a central processing unit (CPU) of an information handling system, a basic input/output system (BIOS) boot failure on the CPU in response to a boot of the information handling system from a first offset of a BIOS memory device including instructions to boot the information handling system;
turning off, by the BMC, the CPU in response to detecting the BIOS boot failure;
directing, by the BMC, the CPU to boot the information handling system from a second offset of the BIOS memory device including instructions to perform a system software management (SSM) task, wherein in performing the SSM task, the method further comprises:
obtaining, by the CPU, a BIOS recovery image;
writing the BIOS recovery image to a main memory device of the information handling system;
verifying the BIOS recovery image; and
writing, by the CPU, the BIOS recovery image at the first offset; and
directing, by the BMC, the CPU to boot the information handling system from the first offset.

11. The method of claim 10, wherein the recovery image is obtained from a BMC persistent memory device.

12. The method of claim 11, wherein the BMC persistent memory device is a master attached flash storage device.

13. The method of claim 11, wherein the BIOS recovery image is stored on the BMC persistent memory device.

14. The method of claim 13, wherein in directing the CPU to boot the information handling system from the second offset, the method further comprises:
setting a bit location of a complex programmable logic device (CPLD) coupled to the CPU from a first state to a second state, wherein the bit location, when set in the first state, directs the CPU to boot the information handling system from the first offset, and, when set in a second state, directs the CPU to boot the information handling system from the second offset.

15. The method of claim 14, wherein in directing the CPU to boot the information handling system from the first offset, the method further comprises:
setting the bit location from the second state to the first state.

16. The method of claim 13, wherein in executing the SMM task, the method further comprises:
verifying the recovery image prior to writing the recovery image to the BIOS memory device.

17. The method of claim 13, wherein in executing the SMM task, the method further comprises:
notifying the BMC that the CPU has completed the SSM task.

* * * * *